Oct. 20, 1970   SHUNPEI KAWANAMI   3,534,634
POWER TRANSMISSION DEVICE
Filed March 5, 1969

United States Patent Office 3,534,634
Patented Oct. 20, 1970

1

3,534,634
POWER TRANSMISSION DEVICE
Shunpei Kawanami, Kanagawa-ken, Japan, assignor to Kabushiki Kaisha Sanko Seisakusho, Kanagawa-ken, Japan
Filed Mar. 5, 1969, Ser. No. 804,414
Int. Cl. F16h 7/00, 7/14
U.S. Cl. 74—722     5 Claims

ABSTRACT OF THE DISCLOSURE

An apparatus for transmitting a power to driven unit, such as an air blower, from at least two actuating units, such as electric motors, which are disposed on a reciprocable support table symmetrically with reference to the shaft of the driven unit so as to produce bending moments on the above-mentioned shaft caused by each of both actuating units substantially balanced, thereby minimizing the load on the bearing for the shaft. At least one of the motors is reciprocable with respect to the support table.

---

The present invention relates to a power transmission apparatus, more particularly a power transmission apparatus comprising a driven pulley fixedly mounted on a shaft of the driven unit and adapted to be driven by at least two driving units symmetrically disposed with reference to the driven pulley such that bending moments caused by both driving units are substantially balanced.

Transmission gears used at high speed are disadvantageous in that the gears must be suitably lubricated by means of lubricant oil which is confined in a small area where they are meshed with each other, thereby causing undue heat to be generated therein. Another disadvantage of the prior art transmission apparatus is that a pressure proportional to the transmitted power will be applied on the driven shaft in a direction normal thereto, The bearings for such shaft are normally provided with a forced lubrication system so as to resist the pressure as described hereinabove. The lubricant is usually cooled by suitable means since it is heated for the reason as mentioned above.

The prior art high speed belt transmission system is also disadvantageous in that the tension on the belt will be increased as higher power is transmitted and the tension is further increased by a centrifugal force due to high speed.

The present invention has been devised to overcome disadvantages of the conventional transmission devices as described hereinabove.

A primary object of the present invention is to provide a power transmission device in which the bending moment applied on the shaft of the driven unit by the driving member is minimized thereby permitting a bearing of very light construction to be used for the shaft.

Another object of the present invention is to provide an arrangement for reducing the bending moment on the shaft of the driven unit due to the driving members in a power transmission device by providing a plurality of driving members disposed in such a manner as to substantially cancel the resultant bending moment on the shaft caused by the driving members.

Still another object of the present invention is to provide a high speed belt transmission device wherein the bearing means for the power shaft of the driven unit is of very light construction by means of a simple and economical arrangement of the driving members.

According to the present invention, there is provided a power transmisson apparatus comprising a driven pulley fixedly mounted on a rotating shaft of driven unit fixedly mounted on a bed frame, a plurality of driving pulleys each mounted on a rotating shaft of each of a plurality of driving members including at least one driving unit reciprocably mounted on a support table member with the other driving unit fixedly mounted thereon, said support table member being provided with a plurality of wheels adapted to roll on rail members secured on said bed frame member, and a plurality of belt members trained over said driven pulley and each of said driving pulleys.

A preferred embodiment of the power transmission device according to the present invention will be described in detail by way of example hereinafter with reference to accompanying drawings, in which.

Figures 1, 2, 3:
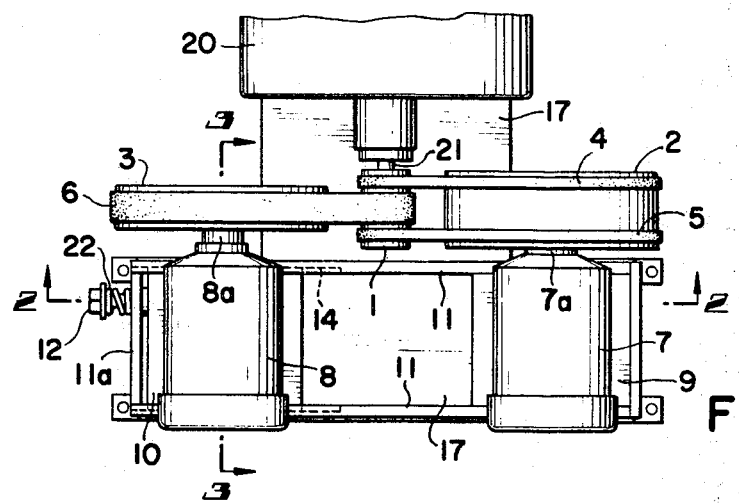
FIG. 1 is a top plan view showing an embodiment of the power transmission apparatus according to the present invention.
FIG. 2 is a side elevation view partly in section showing the power transmission apparatus shown in FIG. 2.
FIG. 3 is a cross-sectional view taken along line 3—3 in FIG. 1, showing a slidable support plate for the driving unit fitted into the groove of side plates of the support table.

Referring to FIGS. 1 and 2, there is shown a bed frame 17 for supporting the driving and driven units with a power transmission means disposed therebetween.

A driven unit 20, such as an air blower, is fixedly mounted on the bed frame 17. A pulley 1 is fixedly mounted on a shaft 21 of the driven unit 20 at the outer end thereof.

A reciprocable support table 11 is placed on the bed frame 17. A member constituted by four rollers 15, 16 are rotatably mounted on the support table 11 in the bottom part thereof so as to roll along rail members 18, 19 which are secured on the bed frame 17, thereby permitting the support table 11 to be freely reciprocated on the bed frame 17.

A first driving member 7, such as an electric motor, is fixedly mounted on the support table 11, more particularly by being clamped to a steel support plate 9 which forms a top plate rigidly connected to the support table 11.

As shown in FIG. 1, a pulley 2 is fixedly mounted on a shaft 7a of the driving member 7 and a pair of belts 4, 5 are trained over the pulley 2 of the driving member, i.e., prime mover 7 and the pulley 2 of the driven member so as to actuate the latter.

A second driving unit 8, such as an electric motor, is reciprocably mounted on the support table 11. That is, a support plate member 10, having the driving unit 8 clamped thereon, is reciprocably fitted into grooves 14 provided on the inner surfaces of both side plates of the support table 11 as shown in FIG. 3.

A depending lug 13 having a threaded hole 13a therein is provided on the sliding support plate member 10 in the bottom surface thereof. An adjusting rod 12 having a threaded end 12a is inserted through an opening 11b drilled through the end plate 11a of the support table 11 so as to have the threaded end 12a thereof engaged with the threaded hole 13a of the lug 13. The adjusting rod 12 is provided with a hexagonal head similar to that of an ordinary bolt and a washer. A coil spring 22 is disposed around the adjusting rod 12 between the washer and the end plate 11a of the support table 11 so as to urge the adjusting rod 12, and thereby the reciprocable support plate 10 to the left as shown in FIG. 1. It will be appreciated that the position of the reciprocable support plate 10 can be adjusted by rotating the adjusting rod 12 by means of a suitable tool (not shown) fitted over the hexagonal head thereof.

Another pulley 3 is fixedly mounted on a shaft 8a of the driving unit 8, and another belt 6 is trained over the pulley 3 of the driving unit 8 and the pulley 1 of the driven member so as to actuate the latter, as seen in FIG. 1.

As shown in FIG. 1, the driven pulley 1 has a diameter much smaller than that of the driving pulley 2 or 3, and both driving pulleys 2 and 3 are disposed substantially in a symmetrical position with reference to the vertical plane passing through the central axis of the driven pulley 1.

Although a pair of belts 4 and 5 each having a smaller breadth are trained between the pulley 1 and the pulley 2, and a single belt 6 of larger breadth is provided between the pulley 1 and the pulley 3, it is understood that a plurality of belts may be trained on the pulley 1 and pulley 3.

The operation of the power transmission device according to the present invention will described hereinafter.

In a balanced condition, the driven pulley 1 will be rotated with a tension on the belt 6 maintained in balance with that of the pair of belts 4 and 5, and no pressure nor any bending moment will be applied on the shaft 21 of the pulley 1.

Now, assuming that the belt 6 is in a slack condition, the adjusting rod 12 will be rotated by means of a suitable tool (not shown) so as to move the depending lug 13, and hence the slidable support plate member 10 to the left along the grooves 14 provided on both side plates of the support table 11. When the driving unit 8 together with the plate member 10 moves to the left, the pair of belts 4, 5 will become taut and cause the support table 11 to be pulled to the right. Since the support table 11 is constructed so as to move horizontally without any resistance on the bed frame 17, the support table 11 will come to a stop only after it is brought into the position wherein the tension in the belt 6 is in balance with that of the belts 4 and 5. Since the pressure on the shaft 21 of the pulley 1 caused by two sets of belts, that is, the belt 6 and the pair of belts 4 and 5 are balanced, there will be no resultant lateral pressure nor any bending moment applied on the shaft 21. Therefore, there will be no load on the bearing (not shown) for the shaft 21 except for the pressure due to the weight of the shaft per se.

For this reason, it will be sufficient to provide a bearing of relatively light construction for the shaft 21.

The spring 22 inserted between the hexagonal head of the adjusting rod 12 and the side plate of the support table 11 will serve to maintain all the belts taut at all times even when they are elongated or extended.

The three pulleys 1, 2 and 3 need not necessarily be located at the same level, but the central pulley 1 may be raised or lowered with reference to both pulleys 2 and 3 so as to have the weight of the rotating mass, i.e., pulleys and shafts, balanced with the tension of the belts.

The support plate 9 may be made slidable similarly to the support plate 10, if desired.

While one preferable embodiment of the power transmission device according to the present invention has been described hereinabove, it is understood that various changes and modifications can be made by those skilled in the art in the construction and parts of the invention without departing from the scope and spirit of the invention as defined in the appended claims.

What is claimed is:

1. Power transmission apparatus comprising a bed frame, a driven unit fixedly mounted on said bed frame and including a rotatable shaft with a pulley fixedly mounted thereon, a support table rollably supported on said bed frame for movement transversely of said shaft, a plurality of driving units mounted on said support table substantially symmetrically with respect to said shaft, adjustment means supporting at least one of said units on said table for reciprocable movement thereon transversely of said shaft, each driving unit including a rotating shaft with a driving pulley thereon, and a plurality of belt members entrained over said driven pulley and each of said driving pulleys.

2. Power transmission apparatus as claimed in claim 1 wherein said plurality of driving units are two in number and the shafts thereof are located on a common level with said shaft of the driven unit.

3. Power transmission apparatus as claimed in claim 1 wherein said plurality of driving units are two in number, the second of the units being fixedly mounted on the support table.

4. Power transmission apparatus as claimed in claim 1 wherein said belt members entrained over the driven and driving pulleys comprise a number of V-belts.

5. Power transmission apparatus as claimed in claim 1 comprising wheels on said support table, and rails secured to said bed frame, said wheels being rollable on said rails.

References Cited

UNITED STATES PATENTS

| 301,380 | 7/1884 | Maltby | 74—722 |
| 847,440 | 3/1907 | Rivett | 74—722 |
| 2,204,877 | 6/1940 | Anderson | 74—242.13 X |
| 2,664,757 | 1/1954 | Shaw | 74—242.14 X |
| 2,874,006 | 2/1959 | Sloyan | 74—242.14 X |

MARK M. NEWMAN, Primary Examiner

T. C. PERRY, Assistant Examiner

U.S. Cl. X.R.

74—242.13, 242.14